United States Patent [19]

Okachi et al.

[11] Patent Number: 5,459,386
[45] Date of Patent: Oct. 17, 1995

[54] MOTOR DRIVE CONTROL APPARATUS HAVING A PLURALITY OF MOTOR CHARACTERISTICS

[75] Inventors: Hiroaki Okachi; Mahito Unno, both of Aichi, Japan

[73] Assignee: Mitsubishi Denki Kabushiki Kaisha, Tokyo, Japan

[21] Appl. No.: 15,521

[22] Filed: Feb. 9, 1993

[30] Foreign Application Priority Data

Feb. 13, 1992 [JP] Japan .................. 4-026543

[51] Int. Cl.⁶ .................................. H02P 7/36
[52] U.S. Cl. .................. 318/727; 318/721; 318/798; 318/803
[58] Field of Search .................. 318/699–830, 318/430–434, 254

[56] References Cited

U.S. PATENT DOCUMENTS

| | | | |
|---|---|---|---|
| 4,230,979 | 10/1980 | Espelage et al. | 318/721 |
| 4,281,276 | 7/1981 | Cutler et al. | 318/803 |
| 4,287,463 | 9/1981 | Walker et al. | 318/803 |
| 4,314,190 | 2/1982 | Walker et al. | 318/798 |
| 4,388,577 | 6/1983 | Blaschke et al. | 318/717 |
| 4,441,064 | 4/1984 | Cutler et al. | 318/798 |
| 4,455,522 | 6/1984 | Lipo | 318/809 |
| 4,539,514 | 9/1985 | Espelage et al. | 318/778 |
| 4,562,396 | 12/1985 | Espelage et al. | 318/809 |
| 4,607,206 | 8/1986 | Sember et al. | 318/798 |
| 4,677,360 | 6/1987 | Gaces | 318/803 |
| 4,757,248 | 7/1988 | Fujioka et al. | 318/807 |
| 4,792,741 | 12/1988 | Matsuo et al. | 318/800 |
| 4,832,133 | 5/1989 | Boys . | |
| 4,926,104 | 5/1990 | King et al. | 318/599 |
| 5,212,438 | 5/1993 | Miyazaki et al. | 318/805 |

FOREIGN PATENT DOCUMENTS

| | | |
|---|---|---|
| 3144188 | 6/1982 | Germany . |
| 61-39888 | 2/1986 | Japan . |
| 64-2559 | 1/1989 | Japan . |
| 1135609 | 5/1989 | Japan . |

OTHER PUBLICATIONS

Patent Abstracts of Japan, unexamined applications, E field, vol. 10, No. 197, Jul. 10, 1986, The Patent Office Japanese Government, p. 60, E 418, No. 61-39 888 (Fuji Electric).

Patent Abstracts of Japan, unexamined applications, M field, vol. 13, No. 385, Aug. 25, 1989, The Patent Office Japanese Government, p. 48, M 864, No. 1-135 609 (Yaskawa Electric).

*Primary Examiner*—Paul Ip
*Attorney, Agent, or Firm*—Sughrue, Mion, Zinn, Macpeak & Seas; Richard C. Turner; Raymond H. J. Powell, Jr.

[57] ABSTRACT

A motor drive control apparatus for controlling an induction motor based on a primary current including a magnetic flux current and a torque current includes a circuit for determining air gap magnetic flux according to a first magnetic flux characteristic curve and a torque current limiting value according to a first torque current characteristic curve in a first speed range; and for determining the air gap magnetic flux according to a second magnetic flux characteristic curve and the torque current limiting value according to a second torque current characteristic curve in a second speed range. A motor driving circuit causes the magnetic flux current corresponding to the air gap magnetic flux and the torque current corresponding to the torque current limiting value to flow in the motor. The first magnetic flux characteristic curve, the first torque current characteristic curve, the second magnetic flux characteristic curve and the second torque current characteristic curve are defined with respect to the operating speed of the motor. The first speed range is defined by a minimum speed and a switching speed of the motor while the second speed range is defined by the switching speed and a higher speed of the motor, often the maximum speed. The circuit can include a memory for storing data corresponding to each of the first magnetic flux characteristic curve, the first torque current characteristic curve, the second magnetic flux characteristic curve and the second torque current characteristic curve.

11 Claims, 17 Drawing Sheets

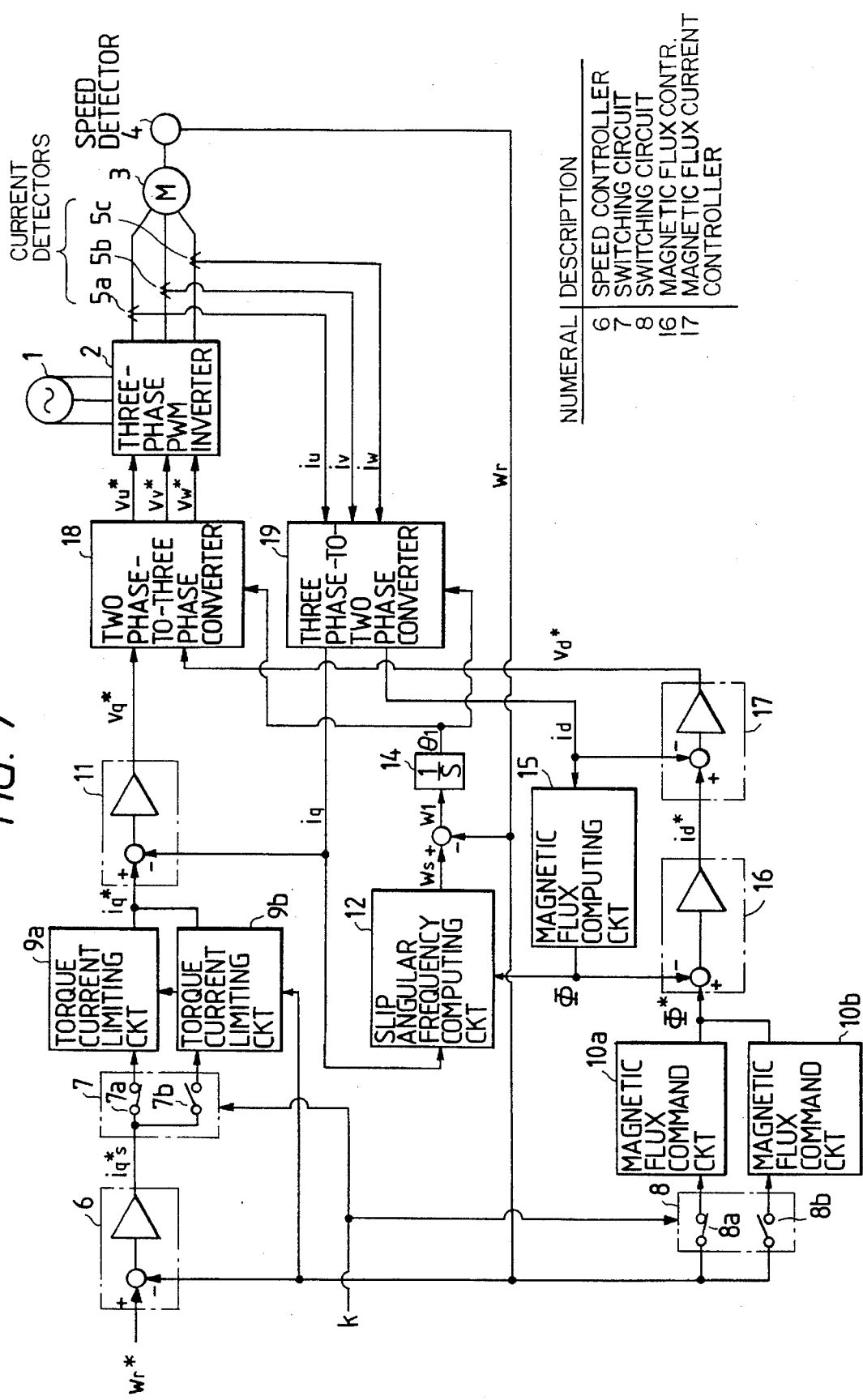

| RPM | 3500 | 7000 | 20000 | 25000 |
|---|---|---|---|---|
| kW | 11 | 22 | 22 | 22 |
| $W_{C1}$ | 650 | 660 | 580 | 590 |
| $W_{C2}$ | 730 | 730 | 730 | 730 |
| $W_i$ | 460 | 1220 | 710 | 680 |
| $W_{LOSS}$ | 1840 | 2610 | 2020 | 2000 |

MOTOR DRIVE CONTROL APPARATUS HAVING A PLURALITY OF MOTOR CHARACTERISTICS

FIELD OF THE INVENTION

The present invention relates generally to a motor drive control apparatus. More specifically, the present invention relates to a motor drive control apparatus for driving a machine tool spindle. According to one aspect of the invention, the motor drive control apparatus advantageously controls an induction motor according to selected ones of a plurality of predetermined characteristic curves in a corresponding plurality of predetermined speed ranges.

BACKGROUND OF THE INVENTION

When light metal, such as aluminum, is cut on a machine tool, e.g., a machining center, the motor for driving a spindle is required to provide high output power at high speed in order to improve cutting efficiency while allowing a highly accurate cut surface to be produced. In addition, the motor of the machining center or the like may be required to produce high torque at low speeds in order to permit this single machine to perform both cutting operations and one or more additional machining operations such as drilling and threading (tapping). Accordingly, when an induction motor is employed to drive the spindle, the induction motor is required to have a characteristic curve which provides both high torque at low speeds and high output power at high speeds, e.g., a 3 kg-m constant torque at not more than 3,500 RPM and 22 Kw constant output power at cutting speeds of about 20,000 RPM to 25,000 RPM. A typical motor characteristic curve for the induction motor with the characteristics described above is illustrated in FIG. 14.

One way to provide the necessary characteristics, i.e., high torque at low speeds and high output power at high speeds, using a single motor, is illustrated in Japanese Utility Model Publication No. 2559 of 1989. As shown in FIG. 15, for example, each phase of the stator windings of the induction motor is provided with two windings C1U' and C2U', C1V' and C2V' and C1W' and C2W', respectively. The various phases are selectively controlled by two three-phase contractors 1M and 2M, wherein the first contactor 1M includes contacts 1MU, 1MV and 1MW and second contactor 2M includes contacts 2MU, 2MV and 2MW. By energizing only the three-phase contactor 1M during low speed operations, the windings C1U' and C2V', windings C1V' and C2V' and windings C1W' and C2W' are Y-connected in series. By energizing only the three-phase contactor 2M during high speed operations, the windings C1U', C1V' and C1W' are delta-connected while the windings C2U', C2V' and C2W' are idle.

As should be clear from FIG. 15, however, the apparatus is low in winding operating efficiency because the C2U', C2V' and C2W' windings are not employed in the high-speed operation range. The motor control system of FIG. 15 is further complicated due to the fact that it requires the three-phase contractors 1M and 2M to switch between as many as nine lead wires for the stator windings of the motor. It should be noted that the motor of FIG. 15 requires a circuit for controlling the opening and closing of the three-phase contractors 1M and 2M, which further hinders efforts to reduce both the size and weight of the motor and associated control apparatus as well as the overall cost of the device.

It will be appreciated that the induction motor can also be controlled by slip-frequency vector control to provide the speed versus output characteristic and the speed versus torque characteristic shown in FIG. 16. In FIG. 16, the torque $T_0$ is constant in the range $0 \leq N \leq N_b$, and the output power $P_0$ is constant at $N_b \leq N$. $N_b$ is referred to as the base speed. In particular, assuming that the primary current of the induction motor is divided into a magnetic flux current id and a torque current iq, controlling the air gap magnetic flux $\Phi$ (secondary flux linkage) and the torque current iq with respect to the speed, as shown in FIG. 17, provides the output characteristics shown in FIG. 16. In FIG. 17, the air gap magnetic flux $\Phi$ is assumed to be $\Phi_0$, which is constant at or below speed $N_b$, while the air gap magnetic flux $\Phi$ is assumed to be indicated by the following expression at speeds in excess of $N_b$:

$$\Phi = \frac{N_b \times \Phi_0}{N} \quad (1)$$

It is also assumed that the torque current iq is $iq_0$, which is constant in the overall velocity range.

FIG. 18 is a control block diagram of a known motor drive control apparatus under slip-frequency vector control. Referring to FIG. 18, the numeral 1 indicates a three-phase commercial AC power supply connected via a three-phase PWM inverter 2 to an induction motor 3 acting as a load. A speed detector 4 and current detectors 5a, 5b and 5c are connected to motor 3. Also shown in FIG. 18 are a speed controller 6, a torque current limiting circuit 9, a magnetic flux command circuit 10, a torque current controller 11, a slip angular frequency computing unit 12, an adder 13, an integrator 14, a magnetic flux computing unit 15, a magnetic flux controller 16, a magnetic flux current controller 17, a two phase-to-three phase converter 18 and a three phase-to-two phase converter 19. The operation of these units are discussed in greater detail below.

In FIG. 18, $\omega_r{*}$ indicates a speed command, $\omega_r$ represents a speed detection signal, iqs* and iq* designate torque current commands, iq denotes a torque current detection signal, $\omega_s$ indicates a slip angular frequency signal, $\omega_1$ designates a primary current angular frequency signal, $\theta_1$ denotes a phase signal, $\Phi^*$ represents a magnetic flux command, $\Phi$ indicates a magnetic flux detection signal, id* denotes a magnetic flux current command, id designates a magnetic flux current detection signal, vq* represents a torque voltage command, $v_n{*}$ indicates a magnetic flux voltage command, $V_u{*}$, $V_v{*}$ and $V_w{*}$ denote three-phase voltage commands, and $i_u$, $i_v$, and $i_w$ designate three-phase current detection signals.

The operation of the control apparatus shown in FIG. 18 will now be described.

The three-phase current detection signals, $i_u$, $i_v$, $i_w$ detected by the current detectors 5a, 5b, 5c, respectively, are input to the three phase-to-two phase converter 19, which then outputs the torque current detection signal iq and magnetic flux current detection signal id under the control of the input three-phase current detection signals $i_u$, $i_v$, $i_w$.

The speed command $\omega_r{*}$ and the speed detection signal $\omega_r$ detected by the speed detector 4 are input to the speed controller 6, which amplifies the difference between the input speed command $\omega_r{*}$ and speed detection signal $\omega_r$ and outputs the torque current command iqs*. This torque current command iqs* is provided as the input to the torque current limiting circuit 9.

If the input torque current command iqs* is smaller than a broken-line value corresponding to the speed detection signal $\omega_r$ in FIG. 17, the torque current limiting circuit 9 outputs the value of the torque current command iqs, intact as the torque current command iq*. In FIGS. 16 and 17, the horizontal axis is represented as speed N but speed N and speed detection signal $\omega_r$ are substantially equivalent since $\omega_r = 2\pi \times N$.

If the input torque current command iqs is larger than the broken-line value corresponding to the speed detection signal $\omega_r$ in FIG. 17, the torque current limiting circuit 9 outputs the broken-line value in FIG. 17 as the torque current command iq*. In other words, the torque current limiting circuit 9 operates to output the torque current command iq* limited to not more than the broken-line value in FIG. 17.

The torque current command iq* and torque current detection signal iq are input to the torque current controller 11, which then amplifies the difference between the input torque current command iq* and torque current detection signal iq and outputs the torque voltage command vq*.

The magnetic flux current detection signal id is input to the magnetic flux computing circuit 15, which calculates air gap magnetic flux $\Phi$ (secondary flux linkage) generated by the magnetic flux current, under the control of the input magnetic flux current detection signal id, according to the following expression:

$$\Phi = \frac{M \cdot R_2}{R_2 + S \cdot L_2} \cdot id \quad (2)$$

where S is a differential operator, $R_2$ is secondary resistance of the induction motor, $L_2$ is secondary inductance, and M is primary/secondary mutual inductance.

The torque current detection signal iq and magnetic flux detection signal $\Phi$ are input to the slip angular frequency computing circuit 12, which then carries out operation according to the following expression (3) under the control of the input torque current detection signal iq and magnetic flux detection signal $\Phi$, and outputs the slip angular frequency signal $\omega_s$.

$$\omega_s = \frac{M \cdot R_2}{L_2} \times \frac{iq}{\Phi} \quad (3)$$

The slip angular frequency signal $\omega_s$ and speed detection signal $\omega_r$ are input to the adder 13, which then adds the input slip angular frequency signal $\omega_s$ and speed detection signal $\omega_r$, and outputs the primary current angular frequency signal $\omega_1$. This output primary current angular frequency signal $\omega_1$ is then input to the integrator 14.

The integrator 14 then generates the phase signal $\theta_1$ under the control of the input primary current angular frequency signal $\omega_1$.

The speed detection signal $\omega_r$ is input to the magnetic flux command circuit 10, which then outputs the magnetic flux command $\Phi^*$ which is equal to the continuous-line value in FIG. 17 corresponding to the input speed detection signal $\omega_r$.

The magnetic flux command $\Phi^*$ and magnetic flux detection signal $\Phi$ are input to the magnetic flux controller 16, which then amplifies the difference between the input magnetic flux command $\Phi^*$ and magnetic flux detection signal $\Phi$ and outputs the magnetic flux current command id*.

The magnetic flux current command id* and magnetic flux current detection signal id are input to the magnetic flux current controller 17, which then amplifies the difference between the input magnetic flux current command id* and magnetic flux current detection signal id, and outputs the magnetic flux voltage command vd*.

The torque voltage command vq* magnetic flux voltage command vd* and phase signal $\theta_1$ are input to the two phase-to-three phase converter 18, which then outputs the three-phase AC voltage commands $V_u^*$, $V_v^*$ and $V_w^*$ in accordance with the input torque voltage command vq* and magnetic flux voltage command vd*.

The three-phase AC voltage commands $V_u^*$, $V_v^*$, $V_w^*$ are input to the PWM inverter 2, which then exercises PWM control of alternating current output by the three-phase commercial AC power supply 1 under the three-phase AC voltage commands $V_u^*$, $V_v^*$, $V_w^*$ and supplies PWM-controlled AC power to the induction motor 3 serving as a load.

As described above, the induction motor 3 can be vector-controlled under the predetermined speed command $\omega_r^*$ and operated to provide the characteristics shown in FIG. 16.

The loss $W_{LOSS}$ generated in the induction motor is represented by the following expression:

$$W_{LOSS} = W_{c1} + W_{c2} + W_I \quad (4)$$

That is, the loss $W_{LOSS}$ is represented by a sum of a primary copper loss $W_{c1}$ attributable to the resistance of the stator windings, a secondary copper loss $W_{c2}$ attributable to the resistance of the rotor windings (bars of the rotor in a squirrel-cage induction motor), and an iron loss $W_I$ collectively generated in the cores of the stator and rotor. It will be apparent that the loss attains its maximum value in the speed range centered on the base speed $N_b$, e.g., in the speed range A shown in FIG. 16.

The components of the loss $W_{LOSS}$ generated in an induction motor designed to operate, as shown in FIG. 19(A), at a base speed of 7,000 RPM, constant torque of 3 kg-m at less than or equal to 7,000 RPM and constant output power of 22 Kw above 7,000 RPM but below 25,000 RPM are as indicated in FIG. 19(B) with respect to typical speeds. FIG. 19(B) indicates that the loss $W_{LOSS}$ of the induction motor reaches a maximum value of 2610 W when the base speed $N_b$ is 7,000 RPM.

The dimensions of the induction motor, i.e., motor diameter and length, and the sizing of an associated cooler device are determined so that the losses can be dissipated. In other words, the dimensions of the induction motor are determined by the base speed and the torque at that base speed. Thus, as the motor torque increases, the motor size increases.

According to another aspect of the motor control system illustrated in FIG. 18, the setting range of the air gap magnetic flux value $\Phi_0$ in the low-speed range, which is shown in FIG. 17, must inevitably be determined based on permissible air gap magnetic flux density and motor shape i.e., motor diameter and length. Initiating torque current iq in the induction motor causes the motor-generated torque to increase in proportion to iq, while, at the same time, causing the motor-generated loss $W_{LOSS}$ to increase in the constant, low-speed range. Because of the limited capability for dissipating the losses generated, iq is limited, which, in turn, restricts the induction motor-generated torque and output power characteristics.

As described above, the prior art shown in FIG. 15 allows a single induction motor to achieve characteristics wherein large torque is required but comparatively low output power may be provided at low speed and high output power is required at high speed. However, the prior art results in decreased motor winding use efficiency and an increased number of motor lead wires, and further requires multiple contractors. Thus, the motor and the cooling apparatus are hindered from being reduced in size and increased in reliability.

Also, the prior art, which drives the induction motor under slip-frequency vector control to provide the speed-versus-output characteristic and speed-versus-torque characteristic shown in FIG. 16, causes motor size to be larger due to a relationship between loss $W_{LOSS}$ near base speed $N_b$ and a heat dissipation characteristic for dissipation of the loss $W_{LOSS}$, whereby the motor or the apparatus is hindered from being reduced in size and increased in reliability.

SUMMARY OF THE INVENTION

Accordingly, the principal purpose of the present invention is to overcome the disadvantages in the prior art.

Another object of the present invention is to provide a motor drive control apparatus which can advantageously provide both high torque at low speeds and high output power at high speeds and which has only three lead wires connected to a motor.

Still another object of the present invention is to provide a motor drive control apparatus which can advantageously provide both high torque at low speeds and high output power at high speeds and which does not require contractors, etc.

Yet another object of the present invention is to provide a motor drive control apparatus which can advantageously provide both high torque at low speeds and high output power at high speeds and which can be manufactured at a low cost.

These and other objects, features and advantages according to the present invention are provided by a motor drive control apparatus for controlling an induction motor based on a primary current including a magnetic flux current and a torque current. The motor drive control apparatus includes a calculating circuit for calculating air gap magnetic flux according to a first magnetic flux characteristic curve and a torque current limiting value according to a first torque current characteristic curve in a first speed range and for calculating the air gap magnetic flux according to a second magnetic flux characteristic curve and the torque current limiting value according to a second torque current characteristic curve in a second speed range. The apparatus also includes a motor driving circuit for causing the magnetic flux current corresponding to the air gap magnetic flux calculated by the calculating circuit and for causing the torque current corresponding to the torque current limiting value calculated by the calculating circuit to flow in the motor.

According to one aspect of the present invention, each of the first magnetic flux characteristic curve, the first torque current characteristic curve, the second magnetic flux characteristic curve and the second torque current characteristic curve are defined with respect to the operating speed of the motor. According to another aspect of the present invention, the first speed range is defined by a minimum speed and a switching speed of the motor while the second speed range is defined by the switching speed and a maximum speed of the motor.

The motor drive control apparatus according to the present invention can include, as part of the calculating circuit, a memory for storing data corresponding to each of the first magnetic flux characteristic curve, the first torque current characteristic curve, the second magnetic flux characteristic curve and the second torque current characteristic curve defined with respect to the operating speed of the motor.

These and other objects, features and advantages according to the present invention are provided by a motor drive control apparatus for controlling an induction motor based on a primary current flowing therein divided into a magnetic flux current and a torque current, including a circuit for determining:

air gap magnetic flux generated by the magnetic flux current with respect to the speed of the motor rotated at not more than a predetermined first speed with predetermined, substantially constant torque and rotated at not less than the first speed and not more than a switching velocity with the magnitude of output power at substantially the first speed held constant, and a torque current limit value for limiting the torque current with respect to the speed of the motor; and air gap magnetic flux generated by the magnetic flux current with respect to the speed of the motor rotated at not less than the switching velocity and not more than a second speed with the torque at substantially the switching velocity held constant and rotated at not less than the second speed with the magnitude of the output power at substantially the second speed held constant, and a torque current limit value for limiting the torque current; and a motor driving circuit for causing the magnetic flux current for generating the air gap magnetic flux calculated by the foregoing circuit and causing the torque current limited by the torque current limit value determined by the circuit to flow in the motor.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted by like or similar numbers, and in which:

FIG. 7 illustrates the control block arrangement of a first preferred embodiment according to the present invention;

DESCRIPTION OF THE PREFERRED EMBODIMENTS

Figure 1A:
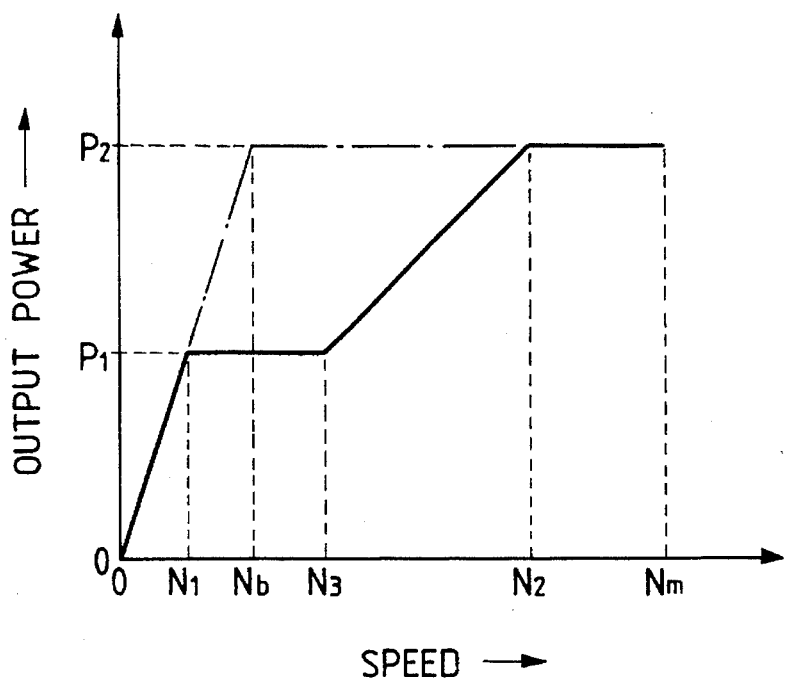
FIG. 1(A) illustrates the speed versus output power characteristic of an induction motor according to the present invention.
Figure 1B:
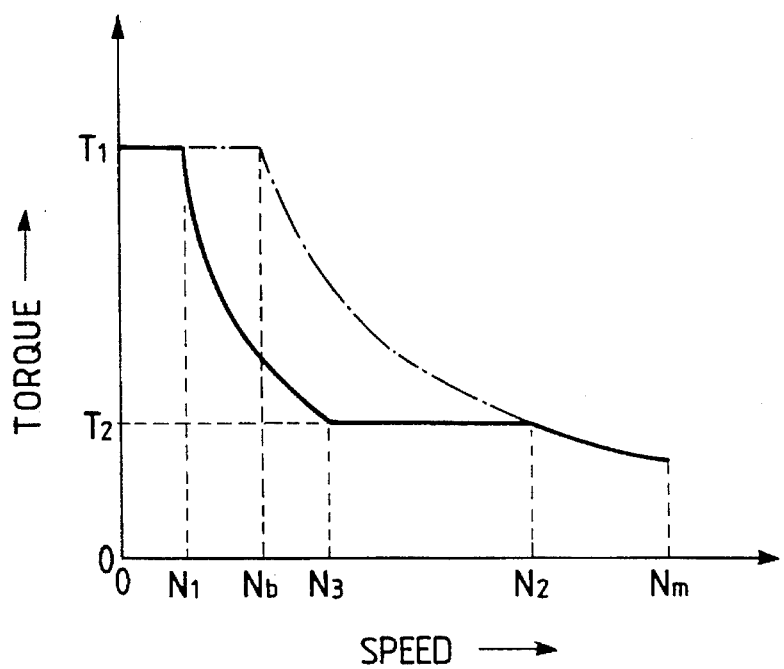
FIG. 1(B) illustrates the speed versus torque characteristic of the induction motor according to the present invention.

A first embodiment according to the present invention will be described while referring to the Figures. FIG. 1 provides an example of the output characteristics of an induction motor obtained by a speed control apparatus according to the present invention. A continuous line shown in FIG. 1(A) represents a characteristic indicating a relationship between speed N and output power P, while a continuous line in FIG. 1(B) denotes a characteristic indicating a relationship between speed N and torque T. More specifically, FIGS. 1(A) and 1(B) collectively show a constant-torque characteristic with a constant torque of T1 where the speed N falls within the speed range of $0 \leq N \leq N_1$, a constant-output power of P1 within the speed range $N_1 \leq N \leq N_3$, a constant-torque characteristic with the constant torque of T2 in the speed range of $N_3 \leq N \leq N_2$, and a constant-output power of P2 in the speed range of $N_2 \leq N \leq N_m$. $N_1$ is referred to as a first speed, $N_2$ as a second speed, P1 as a first output power and T1 as a first torque.

As discussed above, the present invention is particularly suited to a control apparatus associated with a load which requires high torque yet relatively small output power in the low-speed operation range while also being suited for applications demanding high output power in the high-speed operation range, thus allowing an induction motor to provide its maximum capability. A control method by which such output characteristics are advantageously provided will now be described.

To provide the output characteristic and torque characteristic represented by the continuous line in FIGS. 1(A) and 1(B), an induction motor to be controlled according to the present invention is designed to have the characteristics indicated by the dashed lines, i.e., discontinuous, lines in FIGS. 1(A) and 1(B). In particular, it is assumed that $N_b$ is the base speed, the torque T1 is constant at speeds below $N_b$, and the output power P2 is constant at speeds above $N_b$.

Figure 2A:
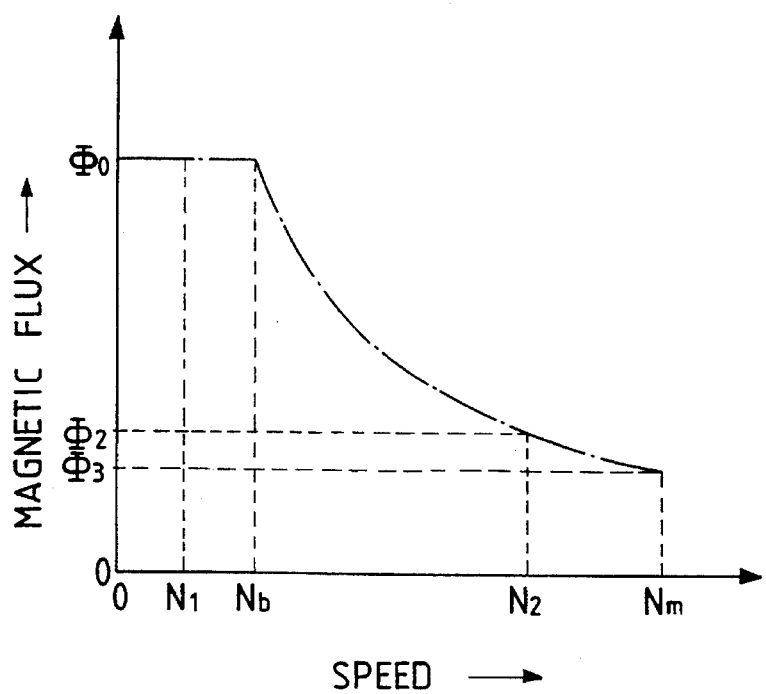
FIG. 2(A) illustrates the speed versus air gap magnetic flux relationship of the induction motor according to the present invention.
Figure 2B:
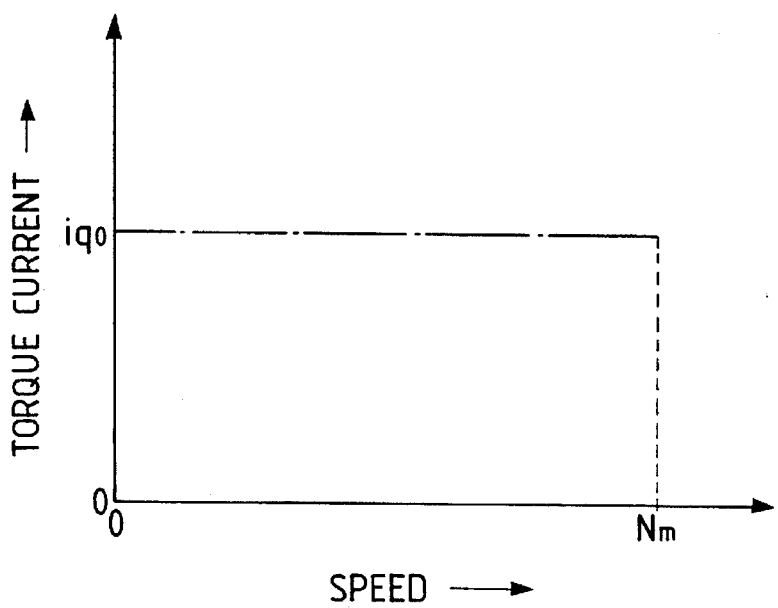
FIG. 2(B) illustrates the speed versus torque current relationship of the induction motor according to the present invention.

In this case, the relationships between the air gap magnetic flux $\Phi$ and the torque current iq with respect to speed N are as shown in FIGS. 2(A) and 2(B), wherein the induction motor can advantageously be designed such that it is unable to provide the output power P2 at the base speed of $N_b$ if considering the conventional induction motor-generated loss $W_{LOSS}$.

In other words, the air gap magnetic flux $\Phi$ is $\Phi_0$, which is constant, at less than base speed $N_b$ and has the following relationship for speeds greater than base speed $N_b$:

$$\Phi = \frac{N_b \times \Phi_0}{N} \quad (5)$$

Torque current iq is equal to $iq_0$, which is constant and independent of speed N.

A method for providing the characteristics indicated by the continuous line in FIGS. 1(A) and 1(B) will now be described.

Figure 3A:
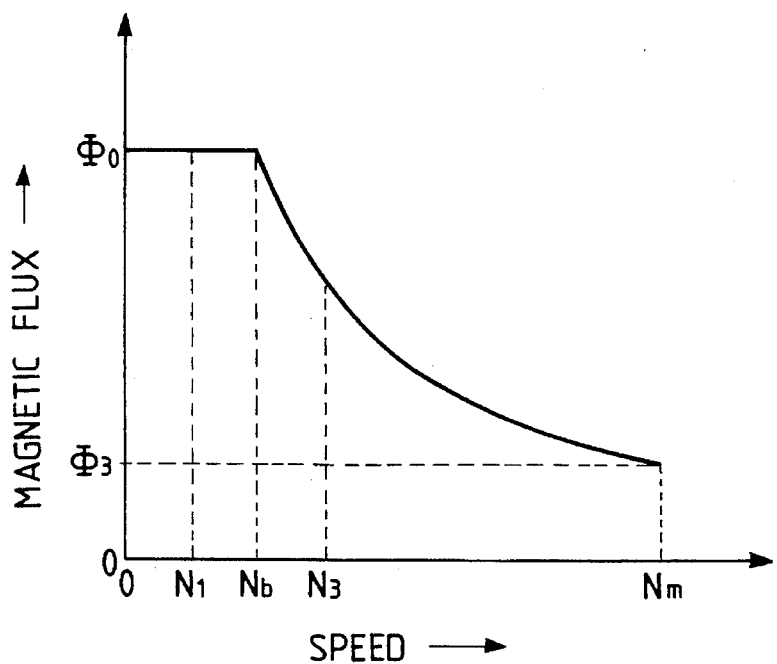
FIG. 3(A) illustrates the first speed versus air gap magnetic flux control pattern of the induction motor according to the present invention.

For this design, two sets of curves representing the relationships between the air gap magnetic flux $\Phi$ and the torque current iq with respect to speed N are prepared, as shown in FIGS. 3(A) and 3(B) and FIGS. 4(A) and 4(B). In FIG. 3(A), the air gap magnetic flux $\Phi_0$ is constant at a speed N below base speed $N_b$ and is represented by the following expression for all speeds above base speed $N_b$:

$$\Phi = \frac{N_b \times \Phi_0}{N} \quad (6)$$

Figure 3B:
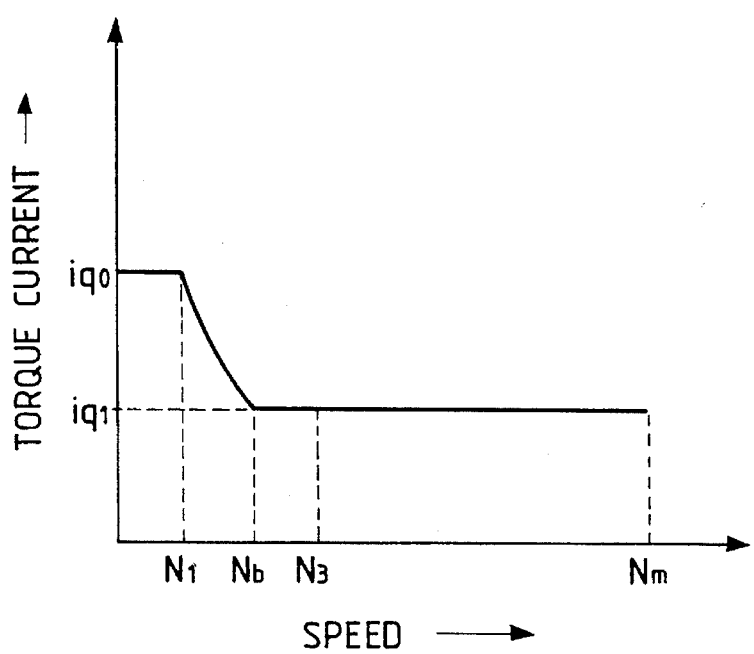
FIG. 3(B) illustrates the first speed versus torque current control pattern of the induction motor according to the present invention.

In FIG. 3(B), the torque current iq is $iq_0$, which is constant for speeds in the range $0 \leq N \leq N_1$, and is represented by the following expression for speeds in the range $N_1 \leq N \leq N_b$:

$$iq = \frac{N_1 \times iq_0}{N} \tag{7}$$

For speeds in the range $N_b \leq N \leq N_m$, iq is $iq_1$, which is constant, as represented by the following expression:

$$iq_1 = \frac{N_1 \times iq_0}{N_b} \tag{8}$$

Figure 4A:
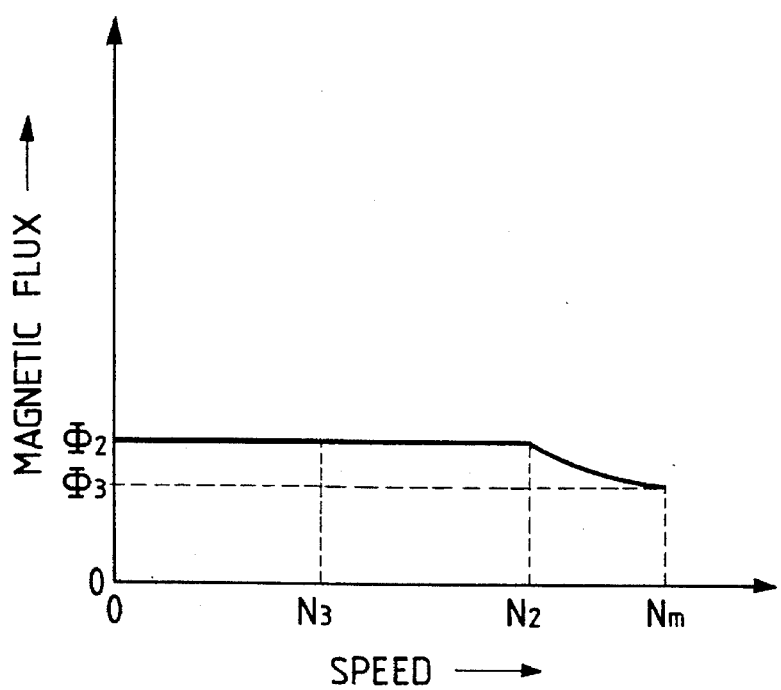
FIG. 4(A) illustrates the second speed versus air gap magnetic flux control pattern of the induction motor according to the present invention.

In FIG. 4(A), the air gap magnetic flux $\Phi$ is $\Phi_2$, which is constant and is represented by the following expression for the speed range $0 \leq N \leq N_2$:

$$\Phi_2 = \frac{\Phi_0 \times N_b}{N_2} \tag{9}$$

For speeds in the range $N_2 \leq N \leq N_m$:

$$\Phi = \frac{\Phi_0 \times N_b}{N} \tag{10}$$

Since the following relationships exist:

Induction motor-generated torque $T \propto \Phi \times iq$; and (11)

Figure 4B:
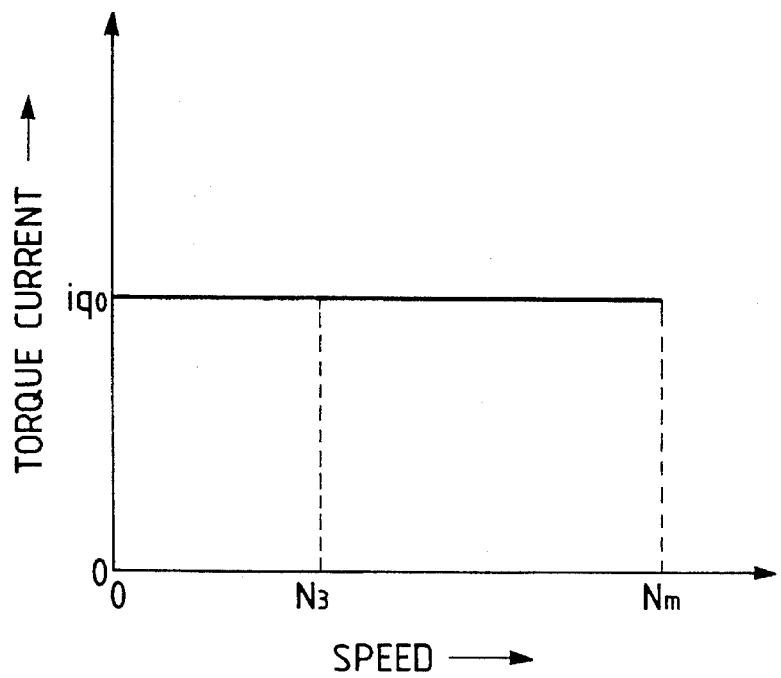
FIG. 4(B) illustrates the second speed versus torque current control pattern of the induction motor according to the present invention.

Induction motor-generated output $P \propto T \times N$; (12)

the target output power and output torque characteristics shown in FIGS. 1(A) and 1(B) can advantageously be provided by exercising control using the speed N versus air gap magnetic flux $\Phi$ and speed N versus torque current iq relationships in FIGS. 3(A) and 3(B) when controlling the motor in the operating range of $0 \leq N \leq N_3$ or using the corresponding relationships illustrated in FIGS. 4(A) and 4(B) when controlling the motor in the operating range of $N_3 \leq N \leq N_m$.

It will be apparent that since the torque current iq is controlled to be smaller than the original motor design value in the range of $N_1 \leq N \leq N_3$, which primarily permits the primary copper loss $W_{c1}$ and the secondary copper loss $W_{c2}$ to decrease, and since the air gap magnetic flux $\Phi$ is controlled to be smaller than the original motor design value in the range of $N_3 \leq N \leq N_2$, which primarily permits the iron loss $W_I$ to become smaller, the net effect is that the motor-generated loss $W_{LOSS}$ can be suppressed. Thus, the operating characteristics indicated by the continuous line in FIGS. 1(A) and 1(B) can advantageously be provided without increasing the motor dimensions excessively and without making the motor cooler larger in size.

Figure 5A:
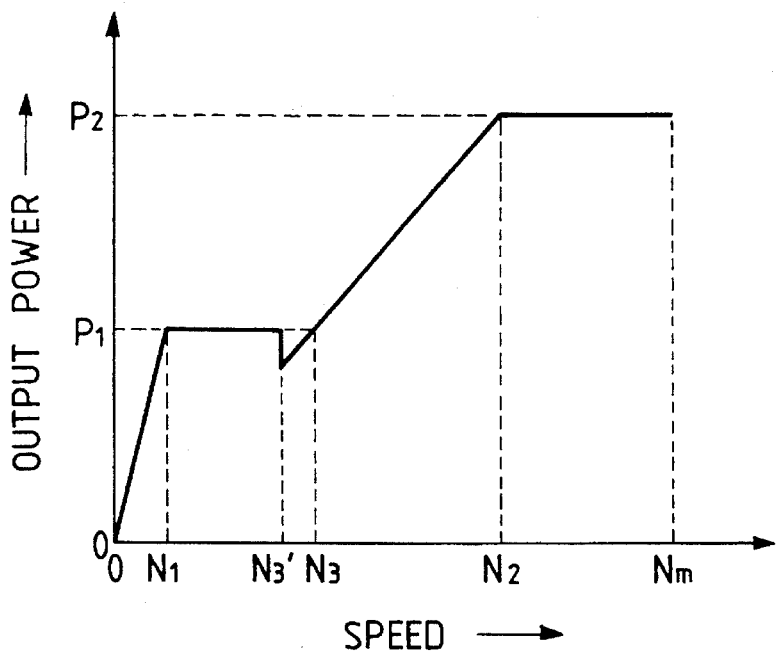
FIG. 5(A) illustrates another speed versus output power characteristic of an induction motor according to the present invention.
Figure 5B:
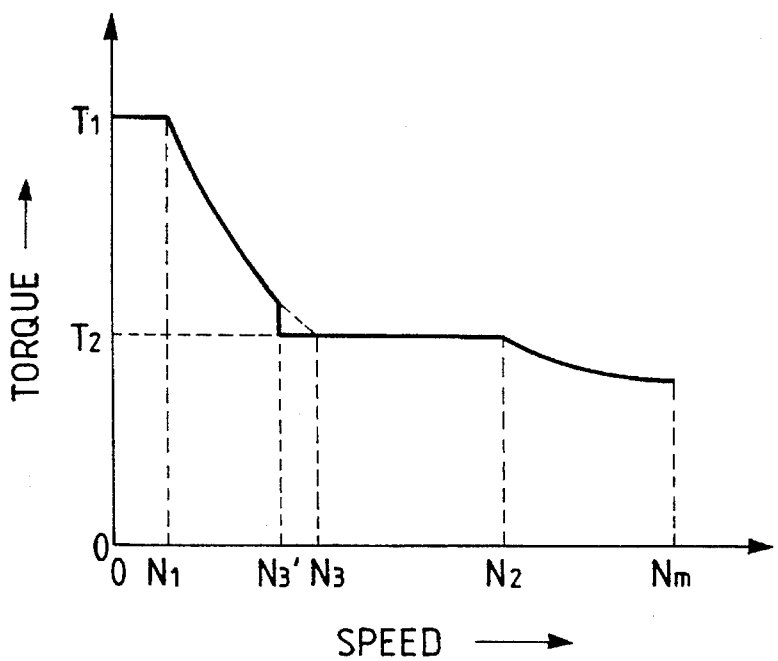
FIG. 5(B) illustrates another speed versus torque characteristic of the induction motor according to the present invention.
Figure 6A:
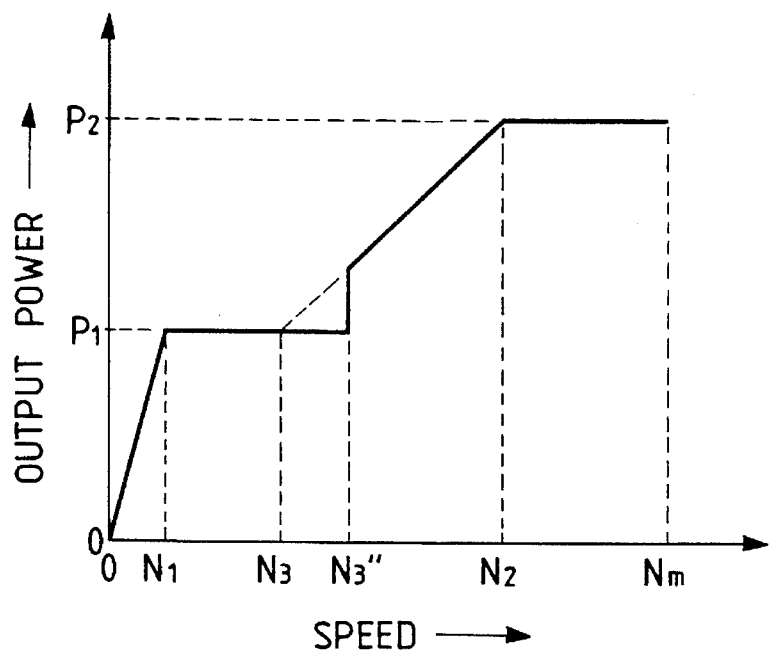
FIG. 6(A) illustrates yet another speed versus output power characteristic of an induction motor according to the present invention.
Figure 6B:
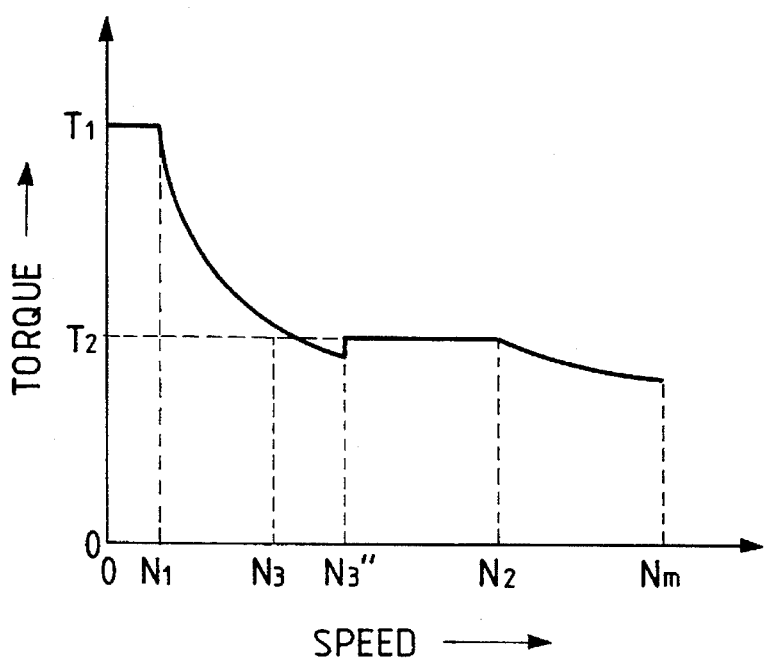
FIG. 6(B) illustrates yet another speed versus torque characteristic of the induction motor according to the present invention.

The borderline speed between the control pattern shown in FIGS. 3(A) and 3(B) and those shown in FIGS. 4(A) and 4(B) need not be the speed $N_3$. The borderline or transition speed may advantageously be selected as speed $N_3$, which is less than speed $N_3$. When the borderline speed $N_3$ is selected, the target output power characteristic and the torque characteristics shown in FIGS. 5(A) and 5(B) can be provided by exercising control, with the speed versus air gap magnetic flux $\Phi$ and speed versus torque current iq relationships in FIGS. 3(A) and 3(B) selected in the operating range $0 \leq N \leq N_3'$ or those in FIGS. 4(A) and 4(B) selected in the operating range $N_3' \leq N \leq N_m$. Similarly, if the borderline speed is $N_3''$, which is greater than $N_3$, the target output power and torque characteristics shown in FIGS. 6(A) and 6(B) can be provided by exercising control, with the speed N versus air gap magnetic flux $\Phi$ and speed versus torque current iq relationships shown in FIGS. 3(A) and 3(B) selected for the operating range $0 \leq N \leq N_3''$ or those in FIGS. 4(A) and 4(B) selected in the operating range $N_3'' \leq N \leq N_m$.

Figure 18:
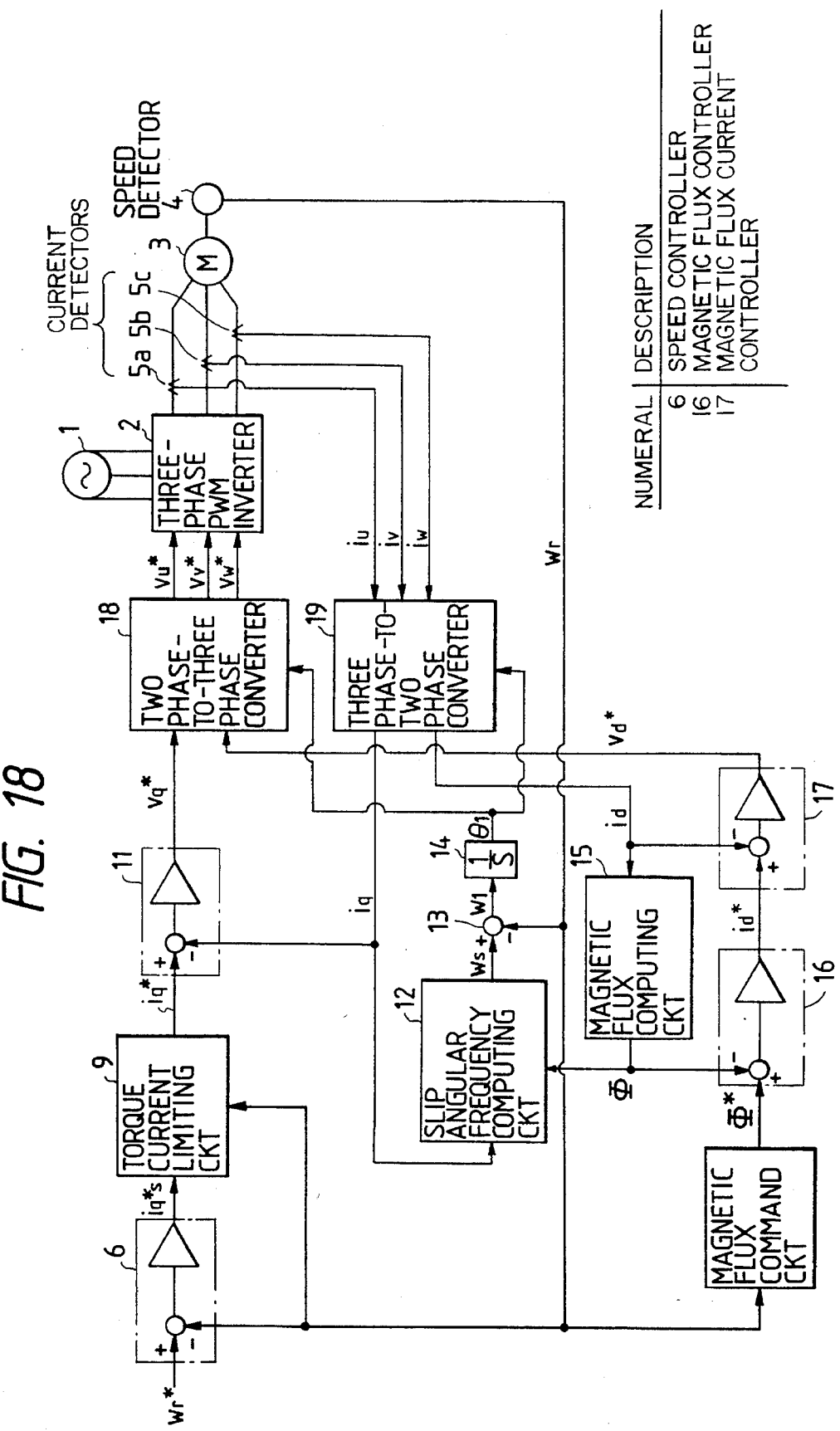
FIG. 18 is a block diagram of a conventional apparatus for providing slip-frequency vector control of an induction motor.
Figures 19A, 19B:
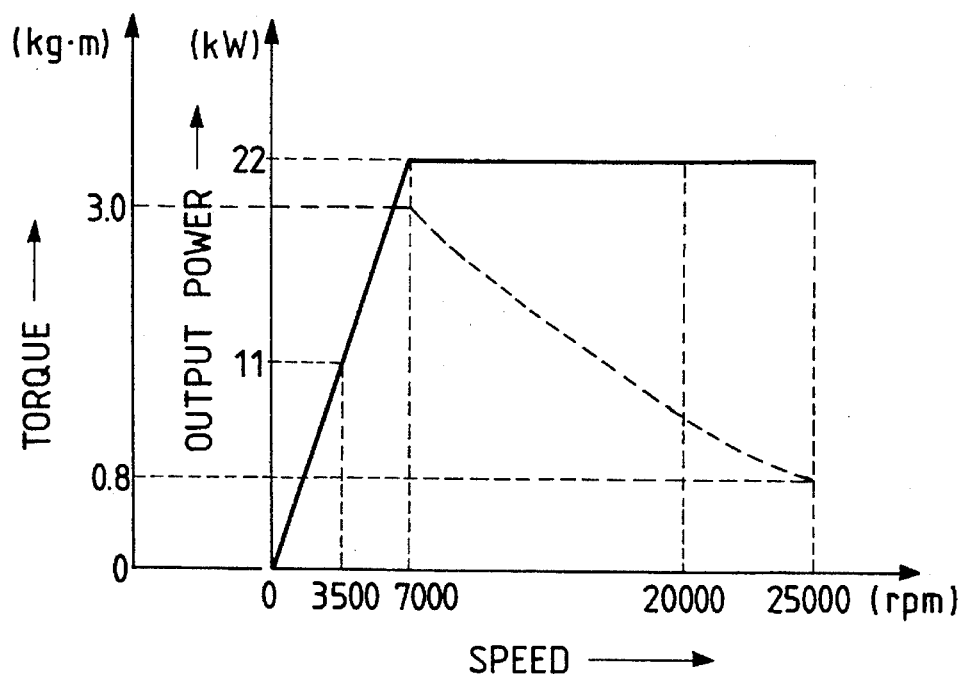
FIG. 19(A) illustrates a characteristic example representing the speed versus output of an induction motor known in the art.
FIG. 19(B) indicates loss values associated with the typical speeds illustrated in FIG. 19(A).

FIG. 7 is a control block diagram of a velocity-controlled motor control apparatus illustrating an embodiment of the present invention, which advantageously includes switching circuits 7, 8, torque current limiting circuits 9a, 9b, magnetic flux command circuits 10a, 10b, and a terminal for receiving switching select signal k. The remaining elements 1–6 and 11–19 are identical to those elements of the prior art apparatus shown in FIG. 18. The various signals $\omega_r^*$, $\omega_r$, iqs*, iq*, $\omega_s$, $\omega_1$, $\theta 1$, $\Phi^*$, $\Phi$, id*, id, vq*, vd*, $V_u^*$, $V_v^*$, $V_w^*$, $i_u$, $i_v$ and $i_w$, are similar to the signals in the prior art apparatus illustrated in FIG. 18.

The operation of the velocity control apparatus according to one preferred embodiment of the present invention will now be described in detail below.

Referring to FIG. 7, the switching circuits 7, 8 comprise selectors 7a, 7b and 8a, 8b, respectively, which, under the control of the switching signal k, turn the selectors 7a and 8a ON and the selectors 7b and 8b OFF in the operating range $0 \leq N \leq N_3$, and turn the selectors 7a and 8a OFF and the selectors 7b and 8b ON in the operating range $N_3 < N \leq N_m$.

In the operating range $0 \leq N \leq N_3$, i.e., when selectors 7a and 8a are turned ON and selectors 7b and 8b are turned OFF, the torque current command iqs* is input to the torque current limiting circuit 9a via the selector 7a, and the speed detection signal $\omega_r$ is input to the magnetic flux command circuit 10a via the selector 8a.

If the torque current command iqs* input is smaller than a continuous-line value corresponding to the speed detection signal $\omega_r$ in FIG. 3(B), the torque current limiting circuit 9a outputs the torque current command iqs* intact. If the torque current command iqs* is larger than the continuous-line value, the torque current limiting circuit 9a outputs the continuous-line value as the torque current command iqs*. In other words, the torque current limiting circuit 9a operates to output the torque current command iqs* limited to not more than the continuous-line value in FIG. 3(B).

The magnetic flux command circuit 10a outputs the magnetic flux command $\Phi^*$, which is equivalent to the continuous-line value corresponding to the speed detection signal $\omega_r$ in FIG. 3(A).

In the operating range $N_3 < N \leq Nm$, i.e., when selectors 7a and 8a are turned OFF and selectors 7b and 8b are turned ON, the torque current command iqs* is input to the torque current limiting circuit 9b via the selector 7b, and the speed detection signal $\omega_r$ is input to the magnetic flux command circuit 10b via the selector 8b.

If the torque current command iqs* input is smaller than a continuous-line value corresponding to the speed detection signal $\omega_r$ in FIG. 4(B), the torque current limiting circuit 9b outputs the torque current command iqs* intact. If the torque current command iqs* is larger than the continuous-line value, the torque current limiting circuit 9b outputs the continuous-line value as the torque current command iqs*. In short, the torque current limiting circuit 9b operates to output the torque current command iqs* limited to not more than the continuous-line value in FIG. 4(B).

The magnetic flux command circuit 10b outputs the magnetic flux command $\Phi^*$ which is equivalent to the continuous-line value corresponding to the speed detection signal $\omega_r$ in FIG. 4(A).

The operations described above provide the output power and the output torque characteristic curves shown in FIGS. 1(A) and 1(B).

It should be noted that the switching circuits 7, 8, the torque current limiting circuits 9a, 9b, and the magnetic flux command circuits 10a, 10b constitute a calculating or determining device. This device may advantageously be provided to either calculate the relationships shown in FIGS. 3 and 4 on the basis of preset expressions, or to calculate these relationships by reading data indicating the relationships shown in FIGS. 3 and 4 stored beforehand in a dedicated memory device. It should also be noted with respect to FIG. 7 that the remaining parts, other than the induction motor 3 and the calculating device, constitute a motor driving device.

Figure 8:
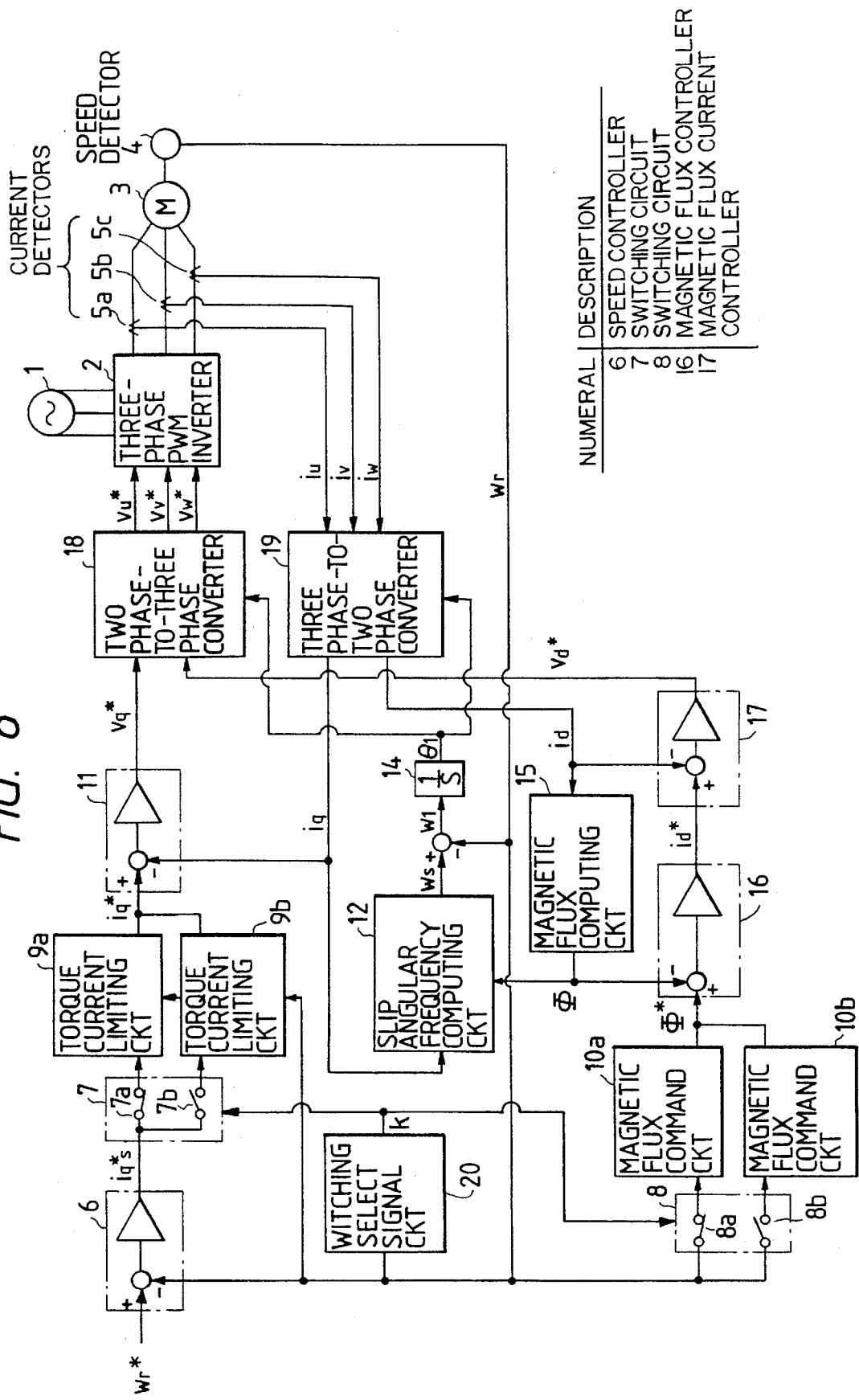
FIG. 8 illustrates the control block arrangement of a second preferred embodiment according to the present invention.

Another preferred embodiment of the present invention will be briefly described referring to FIG. 8, wherein a switching select signal circuit 20, which receives a velocity detection signal $_{107\,r}$ and generates a switching select signal k for operating switching circuits 7 and 8 depending on whether the speed N is in a first speed range $0 \leq N \leq N_3$ or in a second speed range $N_3 \leq N \leq N_m$, is advantageously provided. The other operations are identical to those described above with respect to FIG. 7.

Figure 9:
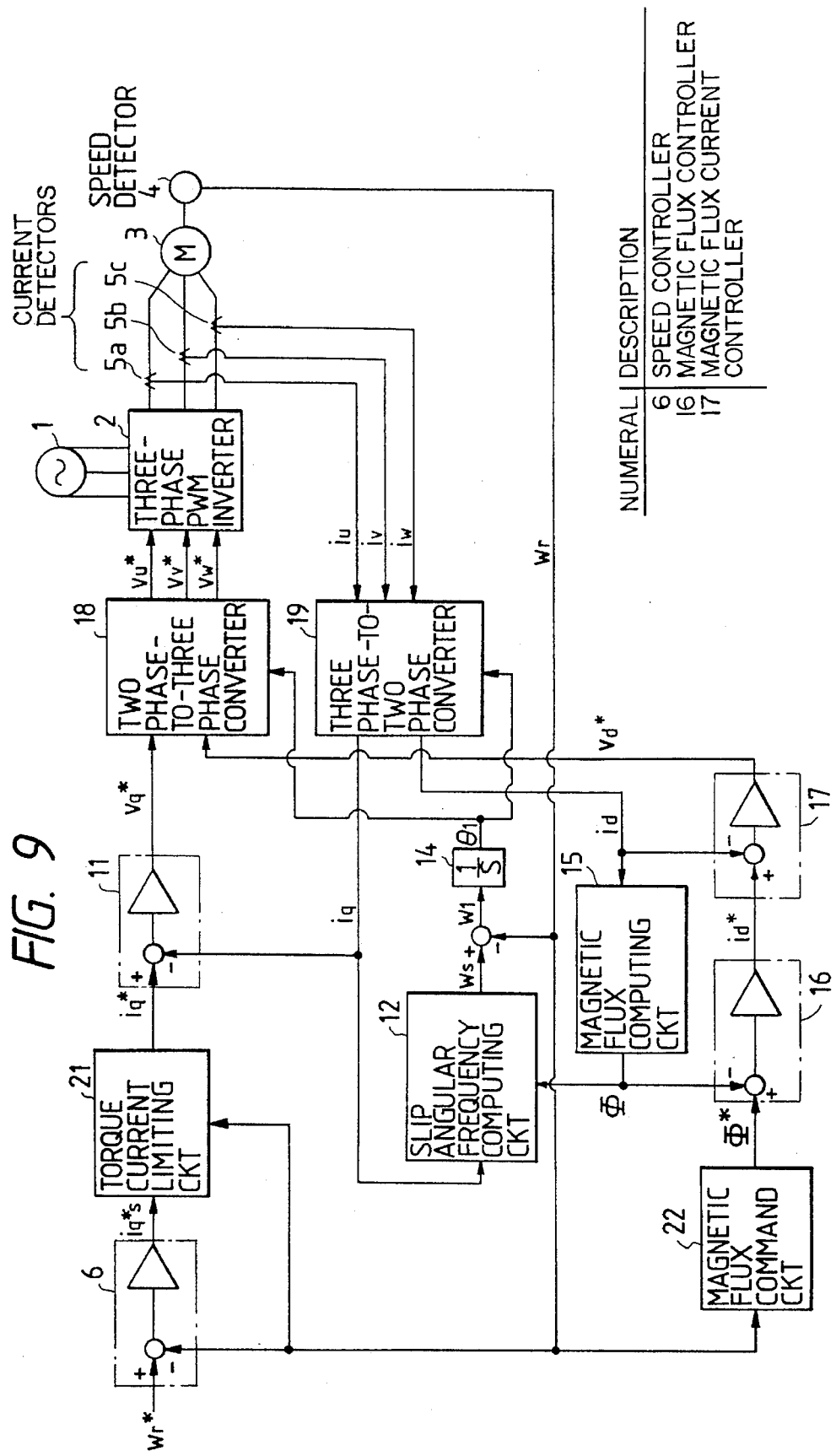
FIG. 9 illustrates the control block arrangement of a third preferred embodiment according to the present invention.
Figure 10A:
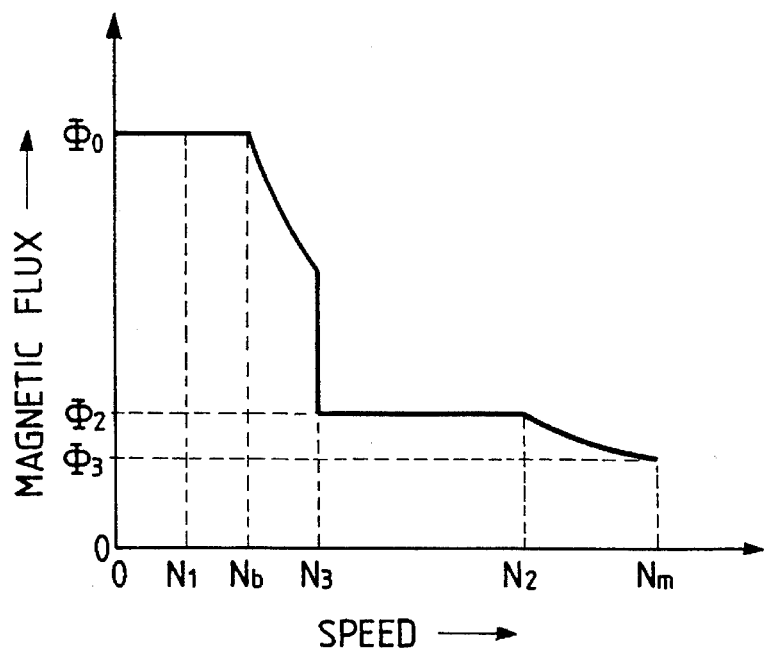
FIG. 10(A) illustrates the speed versus air gap magnetic flux relationship of an induction motor controlled by the circuitry depicted in FIG. 9.
Figure 10B:
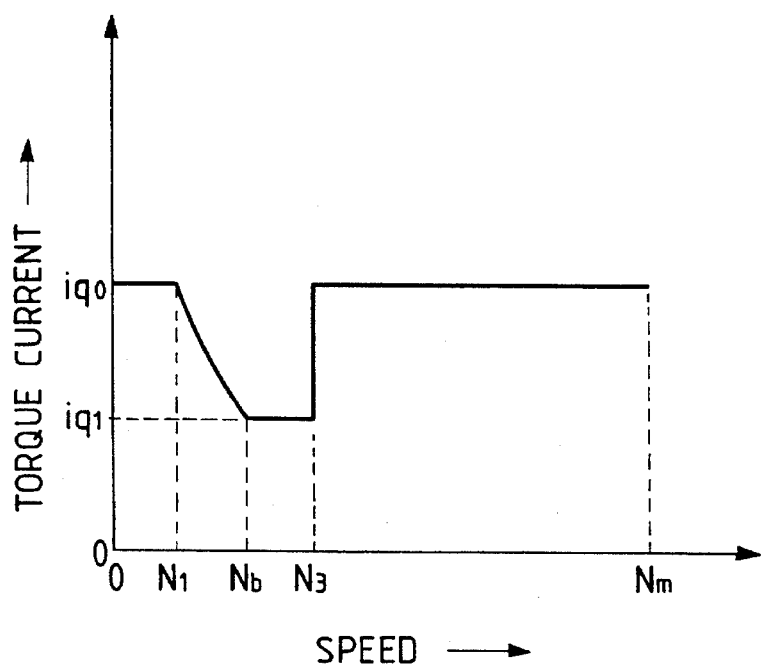
FIG. 10(B) illustrates the speed versus torque current relationship of the induction motor depicted in FIG. 9.

Still another preferred embodiment of the present invention will now be described while referring to FIG. 9, in which a torque current limiting circuit 21 and a magnetic flux command circuit 22 are advantageously included. In an exemplary case, the characteristic curve in FIG. 10(B) is made to correspond to the torque current limiting circuit 21. FIG. 10(B) shows that the characteristic curve of FIG. 3(B) is provided for the speed range $0 \leq N \leq N_3$ while the characteristic curve of FIG. 4(B) is provided for the speed range of $N_3 \leq N \leq N_m$. Preferably, the characteristic curve of FIG. 10(A) is made to correspond to the magnetic flux command circuit 22. FIG. 10(A) shows the characteristic curve of FIG. 3(A) provided for the speed range of $0 \leq N \leq N_3$ and the characteristic curve of FIG. 4(A) provided for the speed range of $N_3 \leq N \leq N_m$. The above described arrangement allows the desired characteristics of FIGS. 1(A) and 1(B) to be provided without employing the switching circuits 7 and 8 employed in the controllers described with respect to FIGS. 7 and 8.

It should again be noted that the torque current limiting circuit 21 and the magnetic flux command circuit 22 constitute a calculating or determining device. In FIG. 9, the remaining components, other than the induction motor 3 and the calculating device, constitute a motor driving device.

Figure 11A:
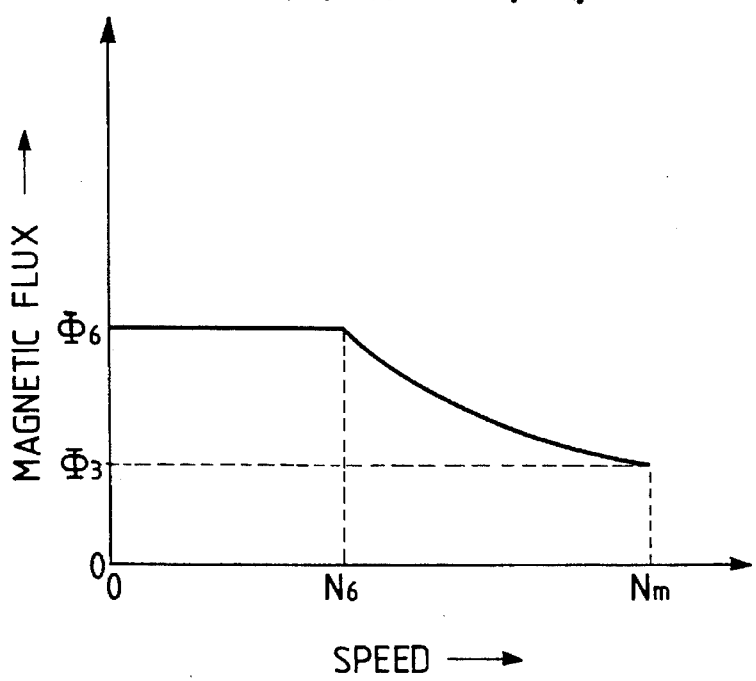
FIG. 11(A) illustrates a third speed versus air gap magnetic flux control pattern for a fourth embodiment according to the present invention.
Figure 11B:
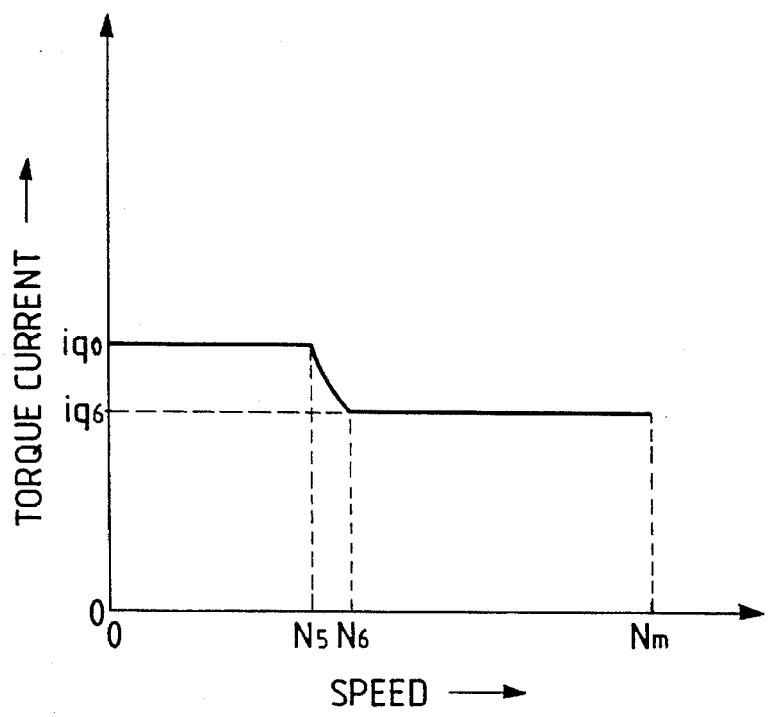
FIG. 11(B) illustrates a third speed versus torque current control pattern in the fourth embodiment according to the present invention.
Figure 12A:
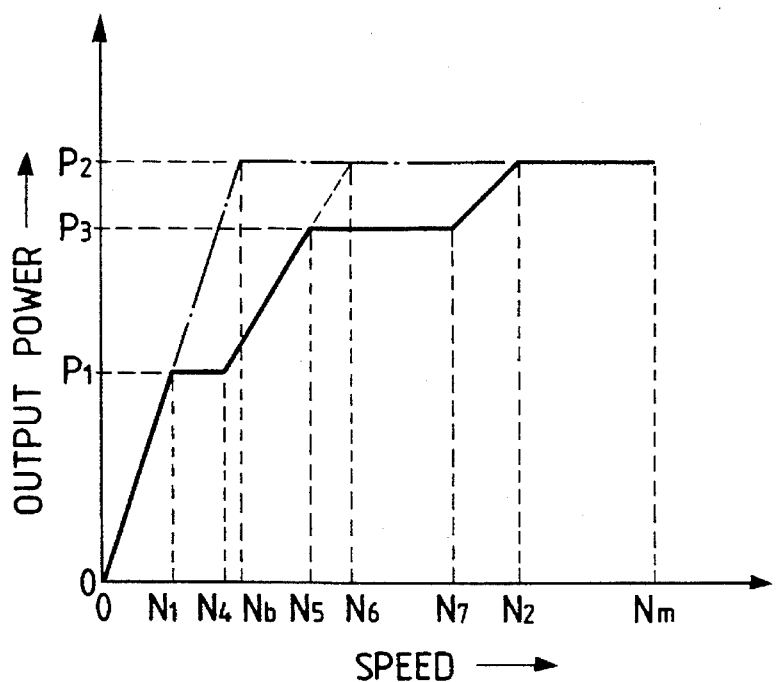
FIG. 12(A) illustrates the speed versus output characteristic of an induction motor provided by the fourth embodiment according to the present invention.
Figure 12B:
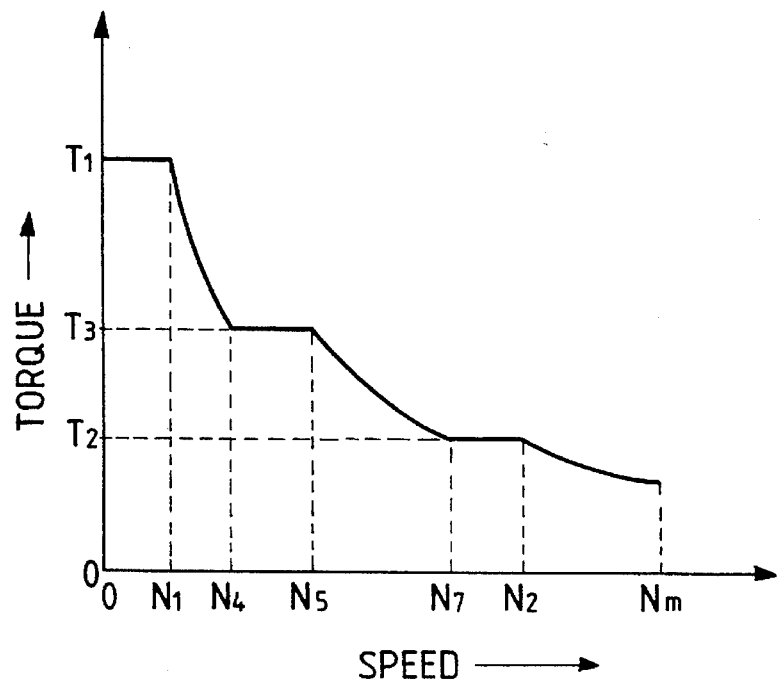
FIG. 12(B) illustrates the speed versus torque characteristic of the induction motor provided by the fourth embodiment according to the present invention.

Yet another preferred embodiment of the present invention will now be described. It should be noted that the previously described embodiments switch between two distinct control patterns of the air gap magnetic flux $\Phi$ and the torque current iq with respect to the speed N. As is clear from these descriptions, however, as long as the losses generated by the induction motor 3, e.g., in the load, fall within permissible limits, adding other control patterns, such as those shown in FIGS. 11(A) and 11(B) to those shown in FIGS. 3(A), 3(B) and FIGS. 4(A), 4(B), and then switching between the control patterns based on speed N is possible, and allows the output characteristic and torque characteristic in e.g., FIGS. 12(A) and 12(B) to be provided. In other words, the various characteristic curves, i.e., a total of three sets of control patterns, can advantageously be provided for three corresponding speed ranges, as follows:

FIG. 3(A), 3(B) for the speed range of $0 < N \leq N_4$;

FIG. 11(A), 11(B) for the speed range of $N_4 \leq N \leq N_7$; and

Figure 13A:
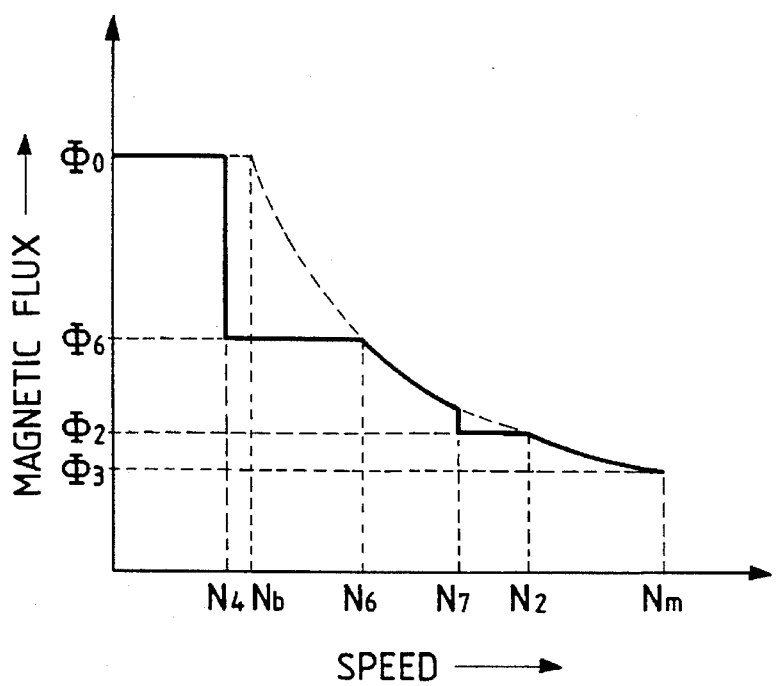
FIG. 13(A) illustrates a speed versus air gap magnetic flux relationship selected in the fourth embodiment according to the present invention.
Figure 13B:
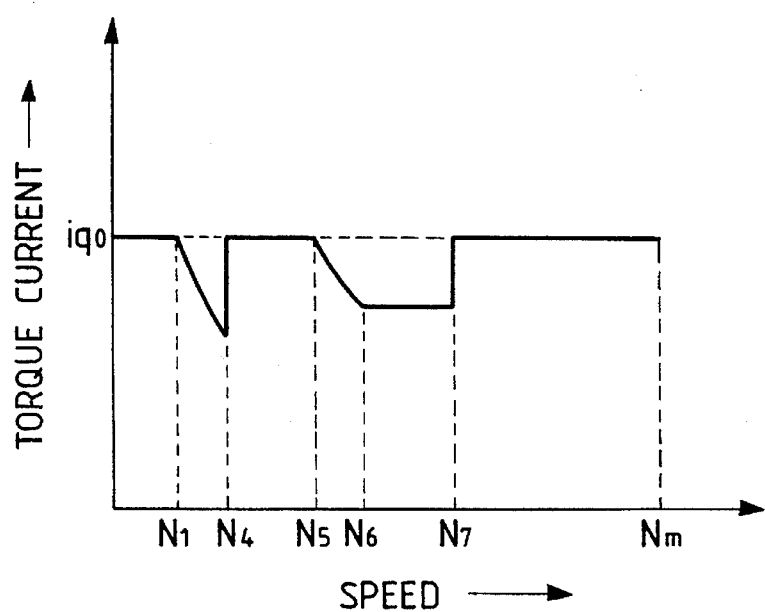
FIG. 13(B) illustrates a speed versus torque current relationship selected in the fourth embodiment according to the present invention.
Figure 14:
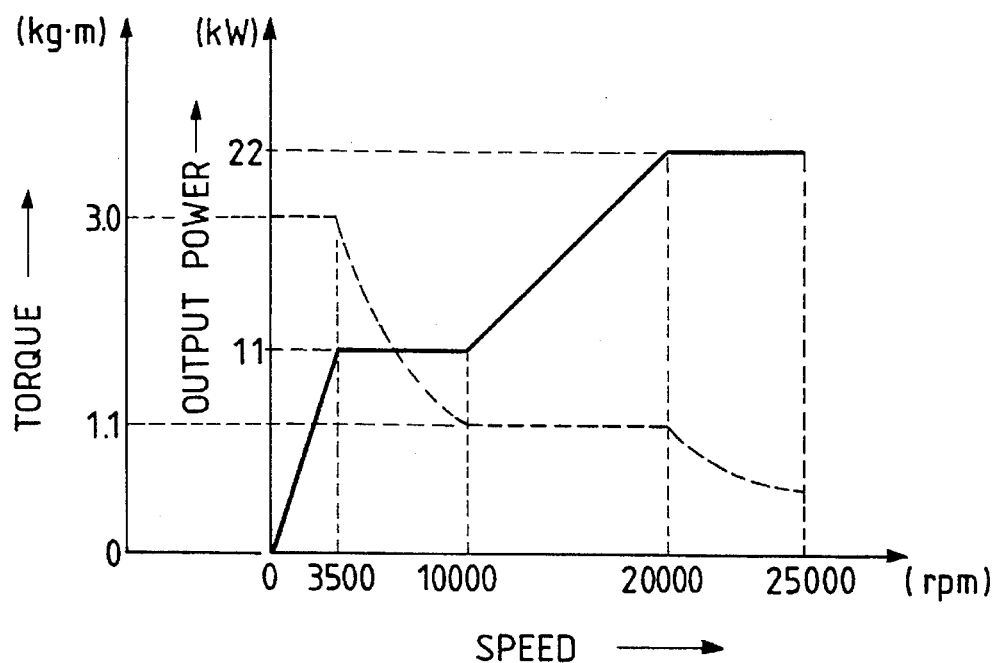
FIG. 14 illustrates an exemplary low-speed, large-torque and high-speed, high-output motor characteristic suitable for a motor employed in driving the spindle of a machining center.
Figure 15:
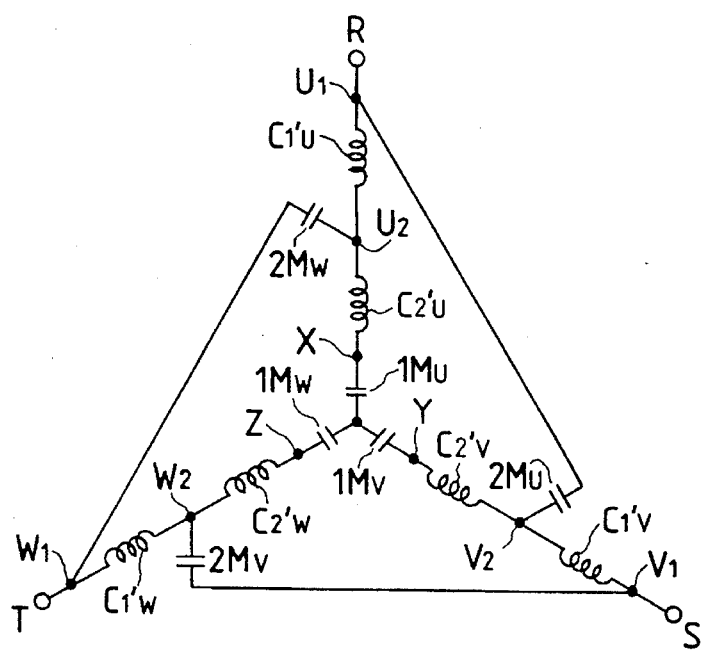
FIG. 15 illustrates a known system for providing low-speed, large-torque/high-speed, high-output typical of that associated with Japanese Utility Model Publication No. 2559 of 1989.
Figure 16:
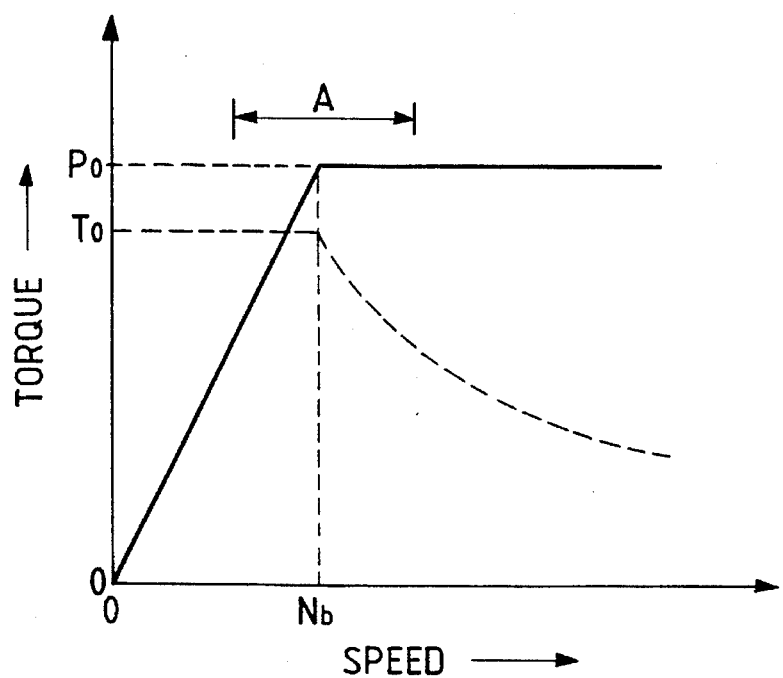
FIG. 16 illustrates the speed versus output and torque characteristics of an induction motor operated according to a slip-frequency vector control method known in the art.
Figure 17:
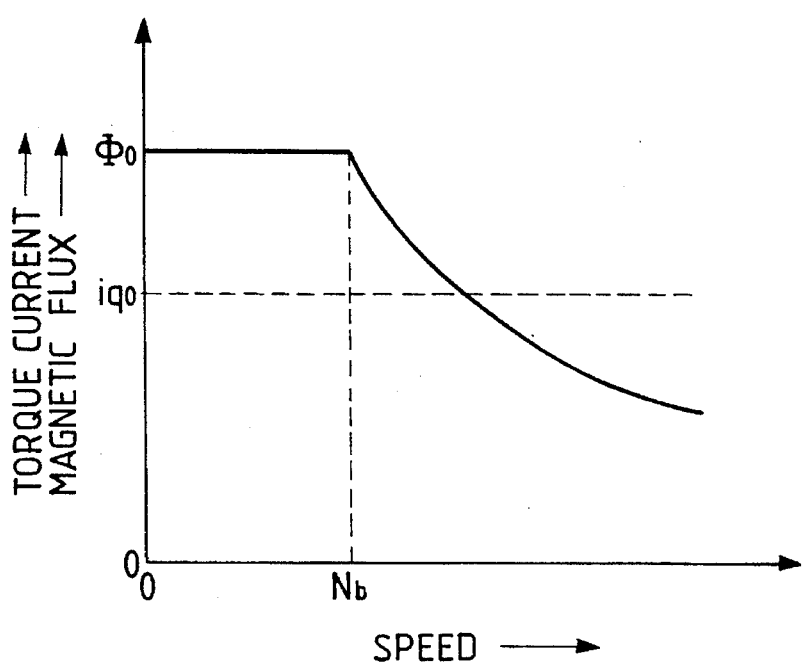
FIG. 17 illustrates the speed versus air gap magnetic flux and torque current relationships of the induction motor operated according to a slip-frequency vector control method known in the art.

FIG. 4(A), 4(B) for the speed range of $N_7 \leq N \leq N_m$;

where $N_4 < N_3 < N_7 < N_2$. Preferably, the speed N versus air gap magnetic flux $\Phi$ and the speed N versus torque current iq characteristics are as shown in FIGS. 13(A) and 13(B), respectively in this case.

It will be apparent that the various embodiments of the present invention, as described above, provide a motor drive control apparatus which drive-controls a motor according to results found by the calculating device, which calculates air gap magnetic flux $\Phi$ and torque current limit values with respect to the current speed N of the motor on the basis of a speed versus air gap magnetic flux $\Phi$ relationship and a speed versus torque current limit value relationship. These relationships are separately set in ranges above and below a predetermined switching velocity so as to provide high-torque, low-saturation output at low speed and low-torque, high-saturation output at high speed. It will be appreciated that a control apparatus providing characteristics of high torque at low speed and high output at high speed can be provided by a low-priced, compact and lightweight motor. It will also be apparent that increases in the number of lead wires and contractors can be avoided in the present invention. Furthermore, an apparatus for controlling the induction motor can be made to be substantially more reliable.

The motor drive control apparatus according to the present invention causes magnetic flux current and torque current to flow in a motor in accordance with the signals output by control circuitry which operates on a magnetic flux command value and a torque current command value with respect to the current speed of the motor so that a first torque of substantially constant magnitude is generated when operating at a speed less than a first speed, a substantially constant first output power is provided above a second speed, which is higher than the first speed by a predetermined velocity, and output power greater than the first output power and torque less than the first torque are provided between the first speed and the second speed.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A motor drive control apparatus for controlling an induction motor based on a primary current flowing therein divided into a magnetic flux current and a torque current, said motor drive control apparatus comprising:

a circuit comprising:

first means for determining air gap magnetic flux according to a first magnetic flux characteristic curve and determining a torque current limiting value according to a first torque current characteristic curve in a first speed range defined by a minimum speed and a switching speed of said motor, and second means for determining said air gap magnetic flux according to a second magnetic flux characteristic curve and determining said torque current limiting value according to a second torque current characteristic curve in a second speed range defined by said switching speed and a speed of said motor higher than said switching speed; and a motor driving circuit causing said magnetic flux current corresponding to said air gap magnetic flux determined by said first and said second means and said torque current corresponding to said torque current limiting value determined by said first and said second means to flow in said motor;

wherein each of said first magnetic flux characteristic curve, said first torque current characteristic curve, said second magnetic flux characteristic curve and said second torque current characteristic curve are defined with respect to an operating speed of said motor.

2. The motor drive control apparatus for controlling an induction motor according to claim 1, wherein at least one of said first and said second means comprises a memory for storing data corresponding to each of said first magnetic flux characteristic curve, said first torque current characteristic curve, said second magnetic flux characteristic curve and said second torque current characteristic curve defined with respect to the operating speed of said motor.

3. A motor drive control apparatus for controlling an induction motor based on a primary current including a magnetic flux current and a torque current, said motor drive control apparatus comprising:

a circuit for determining torque current limiting command signals and magnetic flux command signals, said circuit comprising:

a torque current limiting command circuit generating said torque current limiting command signals based on an output torque versus speed characteristic curve defining output torque with respect to a plurality of different speed ranges including at least a first speed range between a minimum speed and a switching speed and a second speed range between said switching speed and a higher speed;

a magnetic flux command circuit generating said magnetic flux command signals based on an output power versus speed characteristic curve defining output power with respect to said first speed range and said second speed range; and a motor driving circuit controlling said motor in response to said torque current limiting command signals and said magnetic flux command signals so as to permit said motor to operate according to said output torque versus speed characteristic curve and said output power versus speed characteristic curve.

4. The motor drive control apparatus for controlling an induction motor according to claim 3, wherein said torque current limiting command circuit comprises:

a first torque current limiting command circuit for generating said torque current limiting command signals during said first speed range; and a second torque current limiting command circuit for generating said torque limiting command signals during said second speed range; and wherein said magnetic flux command circuit comprises:

a first magnetic flux command circuit for generating said magnetic flux command signals during said first speed range; and a second magnetic flux command circuit for generating said magnetic flux command signals command during said second speed range.

5. The motor drive control apparatus for controlling an induction motor according to claim 4, wherein said calculating circuit further comprises a selector for generating a switching selection signal indicating operation of the induction motor in one of said first speed range and said second speed range.

6. The motor drive control apparatus for controlling an induction motor according to claim 3, wherein said determining circuit comprises a memory for storing data corresponding to each of said first magnetic flux characteristic curve, said first torque current characteristic curve, said second magnetic flux characteristic curve and said second torque current characteristic curve defined with respect to said operating speed of said motor.

7. The motor drive control apparatus for controlling an induction motor according to claim 3, wherein said induction motor is a three-phase induction motor and said motor driving circuit comprises a three-phase pulse width modulated inverter for powering said induction motor.

8. A motor drive control apparatus for controlling a motor with a primary current flowing therein divided into a magnetic flux current and a torque current, said motor drive control apparatus comprising:

a circuit comprising:

first means for determining an air gap magnetic flux generated by said magnetic flux current with respect to a speed of said motor rotated at not more than a first predetermined speed with a predetermined substantially constant torque, and rotated at not less than said first predetermined speed and not more than a switching velocity with the magnitude of an output power being held constant from substantially said first predetermined speed, and second means for determining a torque current limit value for limiting said torque current with respect to the speed of said motor, and an air gap magnetic flux generated by said magnetic flux current with respect to a speed of said motor rotated at not less than said switching velocity and not more than a second predetermined speed with said torque being held constant from substantially said switching velocity, and rotated at not less than said second predetermined speed with the magnitude of said output power being held constant from substantially said second predetermined speed; and a motor driving circuit causing said magnetic flux current, which generates said air gap magnetic flux as determined by said first means, and the torque current which is limited by said torque current limit value as determined by said second means, to flow in said motor.

9. A motor drive control apparatus as defined in claim 8, wherein at least one of said first and said second means includes a memory, wherein said memory stores first data indicating the relationship of the air gap magnetic flux generated by the magnetic flux current with respect to the speed of the motor rotated at not more than the first predetermined speed with a substantially constant torque, and rotated at not less than said first speed and not more than the switching velocity with the magnitude of the output being held constant from substantially said first speed, and wherein said memory further stores:

(a) second data indicating the relationship of the torque current limit value for limiting the torque current with respect to the speed of said motor, (b) third data indicating the relationship of the air gap magnetic flux generated by said magnetic flux current with respect to the speed of said motor rotated at not less than said switching velocity and not more than the second speed with the torque being held constant from substantially said switching velocity, and rotated at not less than said second speed with the magnitude of the output being held constant from substantially said second speed, and (c) fourth data indicating the relationship of the torque current limit value for limiting said torque current with respect to the speed of said motor, and wherein said first and said second means of said circuit determine said air gap magnetic flux and said torque current limit value on the basis of respective data stored in said memory.

10. A motor drive control apparatus for drive-controlling a motor under vector control with a primary current flowing in said motor divided into a magnetic flux current and a torque current, said motor driving control apparatus comprising:

operating means for operating on a magnetic flux command value and a torque current command value with respect to a current speed of said motor so that a first torque of substantially constant magnitude is generated at not higher than a first speed of said motor, a substantially constant first output is provided at not lower than a second speed of said motor which is higher than said first speed by a predetermined velocity, and a second output is provided which is smaller than said first output and second torque is generated which is smaller than said first torque at speeds of said motor that are higher than said first speed but lower than said second speed; and motor driving means for causing the magnetic flux current and the torque current to flow in said motor in accordance with a operation output of said operating means.

11. A motor drive control apparatus for drive-controlling a motor under vector control with a primary current flowing in said motor divided into magnetic flux current and torque current, said motor drive control apparatus comprising:

operating means for operating on a magnetic flux command value and a torque current command value with respect to a current speed of said motor in accordance with data pre-stored in a memory means for storing data indicating the relationship of an air gap magnetic flux to the speed of said motor and indicating the relationship of the torque current to the speed of said motor so that a first torque of substantially constant magnitude is generated at not higher than a first speed, a substantially constant first output is provided at not lower than a second speed which is higher than said first speed by a predetermined velocity, and an output is provided which is smaller than said first output and a torque is generated which is smaller than said first torque at speeds that are higher than said first speed but lower than said second speed; and motor driving means for causing the magnetic flux current and the torque current to flow in said motor in accordance with outputs of said operating means.

* * * * *